(No Model.)  2 Sheets—Sheet 1.

C. H. BARROWS.
MOTOR VEHICLE.

No. 592,682. Patented Oct. 26, 1897.

Witnesses

Inventor
Charles H. Barrows.
by Redman Bros.
Attorneys.

(No Model.) 2 Sheets—Sheet 2.
C. H. BARROWS.
MOTOR VEHICLE.

No. 592,682. Patented Oct. 26, 1897.

Witnesses

Inventor
Charles H. Barrows
by Edson Bro's,
Attorneys

UNITED STATES PATENT OFFICE.

CHARLES H. BARROWS, OF NEW YORK, N. Y.

MOTOR-VEHICLE.

SPECIFICATION forming part of Letters Patent No. 592,682, dated October 26, 1897.

Application filed March 10, 1897. Serial No. 626,789. (No model.)

*To all whom it may concern:*

Be it known that I, CHARLES H. BARROWS, a citizen of the United States, residing at New York, in the county of New York and State of New York, have invented certain new and useful Improvements in Motor-Vehicles; and I do hereby declare the following to be a full, clear, and exact description of the invention, such as will enable others skilled in the art to which it appertains to make and use the same.

My invention relates to improvements in motor road-vehicles in which the entire equipment for propelling the vehicle is carried by the wheel to which the power is applied.

In prior United States Letters Patent No. 567,445, granted to me on September 8, 1896, for motor road-vehicles, I have shown and described a steering bar or frame which carries the motor and the batteries for driving the same when electric power is employed for the propulsion of the vehicle, said motor having its shaft arranged to be thrown into or out of engagement frictionally with the periphery of the propelling-wheel.

My present improvement contemplates, mainly, a novel construction and combination of parts in which the motor is operatively connected to the propelling-wheel by positive gearing. I also combine and organize the elements of the machine so as to counterbalance the weight on the axle of the propelling-wheel, thereby enabling the wheel and motor to run without undue friction, wear, and strain on the operative parts of the machine.

To enable others to understand my invention, I have illustrated embodiments thereof in the accompanying drawings, forming a part of this specification, and in which—

Figure 1:
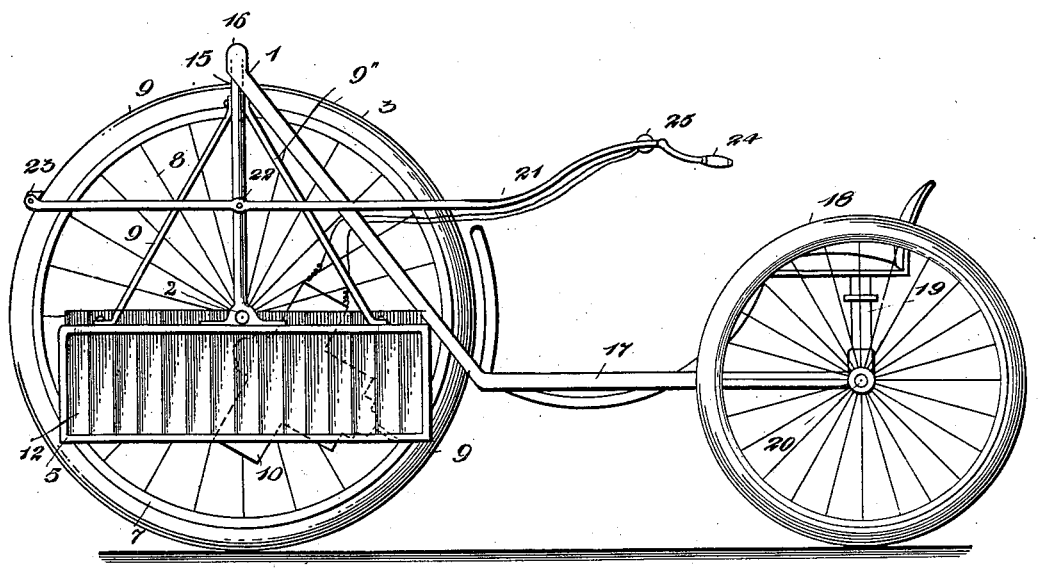
Figure 2:
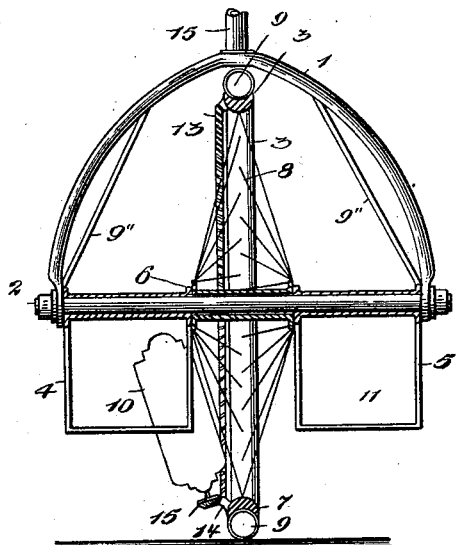
Figure 3:
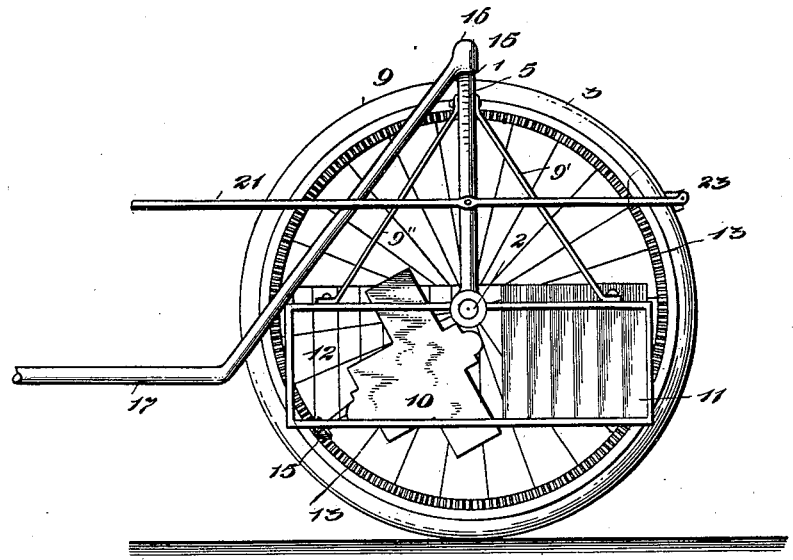
Figure 4:
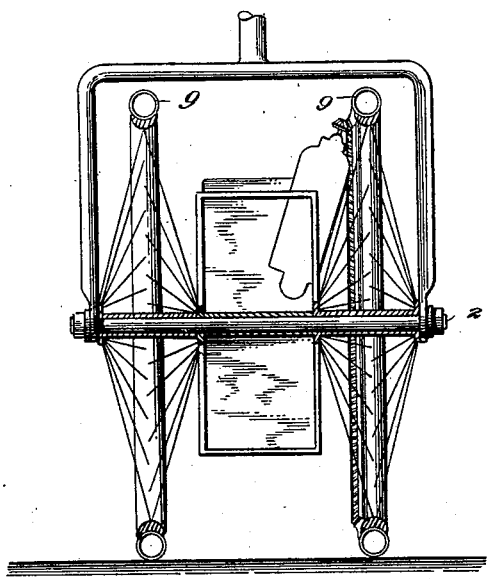

Figure 1 is a side elevation of a motor road-vehicle, illustrating the general plan of my invention. Fig. 2 is a vertical cross-sectional view through the driving and steering wheel on a plane parallel to the axis of the wheel-axle. Fig. 3 is a vertical sectional view on a plane at right angles to Fig. 2. Fig. 4 is a modification of my invention in which the driving-wheel consists of two rims spaced apart to accommodate between them the motor and appliances for furnishing the power.

Like numerals of reference denote corresponding parts in all the figures of the drawings.

My invention resides principally in the front wheel of the vehicle, which is constructed and arranged to carry the motor and the batteries which generate the current for operating the same when electric power is employed for the propulsion of the vehicle. This front wheel has an arch or yoke 1, the extremities of which are constructed to receive and support the ends of a non-rotatable axle 2, said parts being united together in a substantial manner. The width of this arch or yoke between its extremities and the length of the axle are such that the traction-wheel 3 and two frames 4 5 may be fitted to the axle and arranged within the yoke or arch.

The traction-wheel 3 consists of a hub 6, the rim or felly 7, the spokes 8, which unite the rim and the hub together in a suitable manner, and an inflatable tire 9, fitted to the rim or felly, all of said parts comprising the traction-wheel 3 proper being of any preferred or suitable construction. The hub 6 of said traction-wheel is fitted on the axle 2 at the middle portion thereof, and it is held thereon by any suitable means to cause the traction-wheel to maintain a position on the axle midway between the ends of the yoke, while at the same time the traction-wheel 3 is free to rotate on the axle.

The frames 4 5 are made of light metal and they are attached to the axle so as to be suspended centrally therefrom, and these frames are prevented from swaying and are held in their proper positions by braces or struts 9 9', which are fastened to the yoke or arch 1 and extend toward the ends of the suspended frames, to which said braces are fastened in any suitable way. The frame 4 is suspended from that part of the axle between one end of the arch and the side of the traction-wheel adjacent thereto, while the other frame 5 is suspended on the other part of the axle between the opposite end of the yoke or arch and the opposite side of the traction-wheel, the two frames being thus arranged on opposite sides of the traction-wheel and suspended from the axle in a manner to counterbalance each other.

In one frame 4 I place the motor 10 and a series of cells 11 of the storage battery, while in the other frame 5 is arranged another series of cells 12 of the storage battery, the whole arranged to counterbalance and uniformly distribute the weight.

The motor 10 may be of any preferred type, and its shaft is geared directly by positive spur-gearing to the traction-wheel. This motor 10 and the battery-cells 11 in the frame 4 are arranged on opposite sides fore and aft of the transverse vertical center of the front wheel, so that the weight of the cells 11 may balance substantially the weight of the motor. Said motor is attached to the suspended frame in a suitable way, as may be found desirable by a skilled mechanic, and I arrange the motor in a position for its shaft to assume a position radially to the non-rotatable axle 2.

On one side or face of the traction-wheel 3 is arranged a gear-wheel 13, which is fastened to the rim or felly 7 by means of a series of brackets 14, suitably attached to the felly and the back face of the wheel 13. The end of the motor-shaft is adjacent to the toothed face of this gear-wheel 13, and on said end of the shaft is secured a driving-pinion 15, which meshes directly with the gear-wheel 13, whereby the motor and traction-wheel are geared directly together.

The series of cells 12, which are carried by the frame 5, extend substantially throughout the length of said frame, so as to balance the weight of the cells 11 and motor 10 in the frame 4 on the non-rotatable axle, and by arranging the parts in the manner shown and described I not only provide large capacity for storage of energy, but secure distribution of the weight on the axle in a manner to balance the heavy parts and maintain them in equilibrium on the axle, thus preventing listing of the combined propelling and steering wheel of the machine.

The arch or yoke 1 is provided at its top side with an upwardly-projecting central spindle or pintle 15, and on this pintle or spindle is loosely fitted the head 16 of the frame 17, the latter extending backward, so as to join with the frame of the car or carriage 18. The rear end of said car or carriage rests upon a spring 19, attached to a hind axle 20; but the details of the car and the means for sustaining the same may be varied within wide limits without departing from the spirit of my invention.

The steering device is a forked bar or light frame arranged in a substantially horizontal position to embrace the yoke or arch, and this bar or frame is pivotally attached at an intermediate point of its length to the yoke or arch by horizontal pivots, (indicated at 22,) thus connecting the arch and the steering-bar in a manner to insure the yoke turning on its vertical pintle with the bar 21 to deflect the vehicle either to the right or left, but at the same time the bar is adapted to have a limited tilting movement in a vertical plane. The forward end of the steering-bar carries a brake-shoe 23, arranged to press upon the tire of the traction-wheel when the rear end of the steering-bar is raised, but on lowering said rear end of the steering-bar the brake-shoe is raised free from engagement with the traction-wheel. It will be seen that the steering bar or frame serves a twofold purpose, as a means for turning the front wheel of the vehicle either to the right or left to deflect the course of the vehicle, and as a means for adjusting the brake-shoe.

The rear end of the steering bar or frame carries a suitable handle 24, arranged within convenient reach of the occupant.

The cells of the storage battery are coupled with the motor in any usual or preferred way, and they are included in circuit with a switch 25, which is mounted on the steering bar or frame adjacent to the handle 24, thus placing the means for regulating the motor within easy reach of the vehicle's occupant and enabling him to control the motor to start, stop, and regulate the speed of the vehicle, to steer or guide the vehicle, and to apply or release the brake, all from the same place.

In Fig. 4 of the drawings I have illustrated an embodiment of my invention especially designed for vehicles of a comparatively larger and heavier character than the structure shown by Figs. 1 to 3. In this embodiment of my invention I employ the arch or yoke, the non-rotatable axle, the carrying-frames for the battery and motor mounted on the axle, and a duplex wheel; but, as shown, the duplex wheel has its members mounted on the axle close up to the sides of the yoke or arch and are thus spaced thereon to enable the frames, battery, and motor to be placed between the members of said duplex wheel. I preferably arrange one frame above the axle and the other frame below the axle, and the two frames are braced and stayed by rods attached to the arch and the frames. In the upper frame is mounted the motor and a number of cells of the battery, so as to balance each other approximately, and on the lower frame are placed the remaining battery-cells, forming part of the electrical equipment.

While I have shown and described my motor road-vehicle as equipped with an electric motor and with a storage battery, I do not limit myself to the employment of such motor and battery, because I am aware that motors of other kinds for operation by compressed air, gasolene, gas, or other fluid power may be substituted for the electric motor without departing from the principle of my invention. Neither do I restrict myself to the details of construction or form and proportion of parts herein shown and described as the preferred embodiment of the invention, as the same can be changed within wide limits by a skilled mechanic.

Having thus fully described my invention, what I claim as new, and desire to secure by Letters Patent, is—

1. In a motor road-vehicle, the combination with a yoke, of an axle mounted therein, a traction-wheel, and a motor supported directly on said axle and operatively connected by direct positive gearing to said traction-wheel, independently of the tire thereon, for the purposes described, substantially as set forth.

2. In a motor road-vehicle, the combination with a steering-yoke and means for controlling the same, of an axle mounted in said yoke, a traction-wheel, and a motor carried directly on said axle and having its motor-shaft connected by direct positive gearing to the traction-wheel independently of the tire thereon, substantially as and for the purposes described.

3. In a motor road-vehicle, the combination with a steering-yoke, and an axle therein, of a traction-wheel, a motor carried directly on said axle and having its motor-shaft connected by positive gearing to said traction-wheel, a steering bar or lever independent of said motor and connected with said yoke, and motor-controlling devices carried by said steering bar or lever, substantially as and for the purposes described.

4. The combination with a steering-yoke, an axle, and a traction-wheel, of a power equipment independent of the steering devices and arranged to be carried entirely by said axle and embracing a motor the shaft of which is operatively connected by direct positive gearing with the traction-wheel, substantially as and for the purposes described.

5. The combination with a steering-yoke, an axle, and a traction-wheel, of a frame or frames supported directly by said axle, a power equipment carried by said frame or frames and embracing a motor the shaft of which is geared positively and directly to the traction-wheel, and a steering bar or lever independent of said power equipment and carrying the motor-controlling mechanism, substantially as and for the purposes described.

6. The combination with a yoke or frame, an axle, and a traction-wheel, of a gear attached to the traction-wheel, a frame supported by said axle, and a motor carried by the frame and having its motor-shaft provided with a pinion which meshes with the gear on said traction-wheel, as and for the purposes described.

7. The combination with a yoke or frame, an axle, and a traction-wheel, of a frame carried by the axle, an electric motor mounted in said frame and having its shaft geared positively by spur-gearing to the traction-wheel, and a battery also supported by said frame and arranged to balance the motor.

8. The combination with a yoke or frame, an axle, and a traction-wheel, of a power-equipment frame supported by said axle, an electric motor and a battery therefor carried by said frame to balance each other, and the shaft of said motor geared directly by positive spur-gearing to the traction-wheel independently of the tire thereon, a steering-bar, and motor-controlling devices carried by said steering-bar, for the purposes described, substantially as set forth.

9. The combination with a yoke or frame and an axle, of carrying-frames supported by said axle, a traction-wheel fitted loosely thereon, an electric power equipment having a battery carried by said frames and a motor geared to the traction-wheel by positive spur-gearing, and a steering bar or lever carrying a circuit-controller which is included in an electric circuit with said battery and motor of the electrical power equipment, substantially as and for the purposes described.

10. In a motor road-vehicle, the combination with a suitable vehicle or carriage, of a yoke or frame pivotally connected therewith and carrying a non-rotatable axle, a traction-wheel fitted on said axle, a power mechanism sustained by said axle and embracing a motor which has its shaft operatively connected by direct spur-gearing to said traction-wheel, a steering bar or lever, independent of the power equipment and connected to said yoke or frame, and motor-controlling devices carried by said steering bar or lever, as and for the purposes described.

In testimony whereof I affix my signature in presence of two witnesses.

CHARLES H. BARROWS.

Witnesses:
G. HOWLEY,
HENRI BOURDAIS.